United States Patent [19]
McAllister

[11] Patent Number: 6,113,839
[45] Date of Patent: Sep. 5, 2000

[54] METHOD OF PRODUCING A SEAMLESS VANITY ENCLOSURE

[75] Inventor: George P. McAllister, Nashville, Tenn.

[73] Assignee: Aqua Bath, Inc., Nashville, Tenn.

[21] Appl. No.: 09/220,012

[22] Filed: Dec. 21, 1998

[51] Int. Cl.⁷ ................................................. B29C 51/10
[52] U.S. Cl. ............................ 264/512; 4/630; 264/544; 264/554; 264/318; 425/388; 425/441
[58] Field of Search ................................. 264/553, 571, 264/318, 510, 512, 544, 554; 425/387.1, 388, 441; 4/630, 631, 638

[56] References Cited

U.S. PATENT DOCUMENTS

| | | | |
|---|---|---|---|
| 3,813,706 | 6/1974 | Williams | 4/187 R |
| 3,986,809 | 10/1976 | Haag | 425/388 |
| 4,101,256 | 7/1978 | White et al. | 425/441 |
| 5,597,593 | 1/1997 | Lebensfeld et al. | 425/410 |
| 5,766,536 | 6/1998 | Felder | 264/297.1 |
| 5,985,972 | 11/1999 | Minghetti | 524/437 |

*Primary Examiner*—Jill L. Heitbrink
*Assistant Examiner*—Dae Young Lee
*Attorney, Agent, or Firm*—B. Craig Killough

[57] ABSTRACT

A modular, vacuum formed, unitary vanity which extends from floor to the ceiling, or near the ceiling. Alternatively, the vanity extends upwardly from the counter top level to the ceiling. The vanity is vacuum formed of a single piece of formable material, such as acrylic. The vanity has no joints or seals to deteriorate with use and time or to collect dirt. The modular and unitary vanity fits within a void formed in a wall during construction. The device is substantially maintenance free in ordinary use. The vanity is vacuum formed from a single piece of formable material using a vacuum form mold. The mold is a break apart mold which allows the vanity to be removed from the mold without interference from the sink bowl which is formed in the vanity.

3 Claims, 2 Drawing Sheets

METHOD OF PRODUCING A SEAMLESS VANITY ENCLOSURE

FIELD OF THE INVENTION

This invention is a modular, vacuum formed, unitary vanity which provides a wet sink, a counter and a surround, and which may be mounted into a void formed in a wall.

BACKGROUND OF THE INVENTION

It is common for certain bathroom devices, such as shower enclosures or tubs, to be formed as a single unit of plastic or fiberglass. These units can be installed on a job site during construction with minimal effort and cost. Unitary fabrication of a shower enclosure eliminates seams, which could leak, thereby avoiding problems associated with improper assembly or joining of parts at the job site. When multiple units are installed at a single site, such as when hotel rooms, nursing homes, hospitals or apartments are constructed, installation of unitary or modular shower or tub enclosures is simple and cost effective.

The use of unitary vanities is not as prevalent. Most vanities are fabricated on the construction site, with counter tops, cabinets, and mirrors assembled in the room. While some vanities appear to be formed as one, seamless piece of material, they are actually composed of separate sections.

Fabrication on site does not typically occur at a single time. It is necessary to have different types of artisans or craftsmen for different stages of fabrication and installation, such as a carpenter, cabinet maker, finish carpenter, tile setter or fiberglass worker, and plumber.

On site fabrication of the vanity means that parts must be fabricated and/or assembled, creating the possibility that the assembly will not be performed properly. Fabrication and assembly problems must be corrected later. If the problems are unnoticed, additional issues and associated damage may result. For example, if water leaks into walls or floors, the need for major repairs at a later date may arise.

In addition to fabrication, assembly and construction problems, there may be later maintenance problems. Multiple seals or joints between different kinds of material (e.g. wood to tile or wood to acrylic), even if properly done initially, may necessitate additional maintenance at a later date.

One maintenance problem is cleanliness, particularly in hospitals, nursing homes or hotels, where daily cleaning is necessitated. Cracks in seals and crevices where parts are joined are difficult to clean, and can become breeding grounds for bacteria due to the humid environment of a bathroom. Thorough cleaning requires more time and expense.

Fabricating a unitary vanity presents practical problems. Molding a vanity from plastics by vacuum forming is a problem, since the shape of the vanity dictates a mold which cannot be subsequently released from the part. In particular, the shape of the sink bowl, in combination with other vanity surfaces, holds the part within the mold after the part is formed and set. Accordingly, some vanities may be formed by molding, but use drop in sink bowls which are formed separately, or the vanities are not truly modular as the term is used the present invention.

SUMMARY OF THE INVENTION

The present invention provides a modular, vacuum formed, unitary vanity which extends from floor to the ceiling, or near the ceiling. Alternatively, the vanity may extend upwardly from the counter top. "Modular" means that the vanity may be positioned in a rectangular or square void in a wall, so that the vanity is substantially flush with the wall, without requiring the joining of parts other than plumbing. The vanity is unitary, vacuum formed of a single piece of formable material, such as acrylic. The vanity has no joints or seals to deteriorate with use and time or to collect dirt.

The modular and unitary vanity fits within a rectangular void formed in a wall during construction, and is easy to position and affix to the wall. It is particularly well suited for rooms, such as hospital, nursing home or hotel rooms, and suites and apartments, where multiple installations are made at the same time. Water and drainage are supplied to the sink. No other construction activities are required.

The smooth surfaces of the non-porous single piece unit make it easy to clean. The device is substantially maintenance free in ordinary use.

The method of making vanity involves vacuum forming a single piece of formable material using a vacuum form mold. The mold is a break apart mold which allows the vanity to be removed from the mold without interference from the sink bowl which is formed in the vanity.

DETAILED DESCRIPTION OF THE PREFERRED EMBODIMENT

Figure 1:
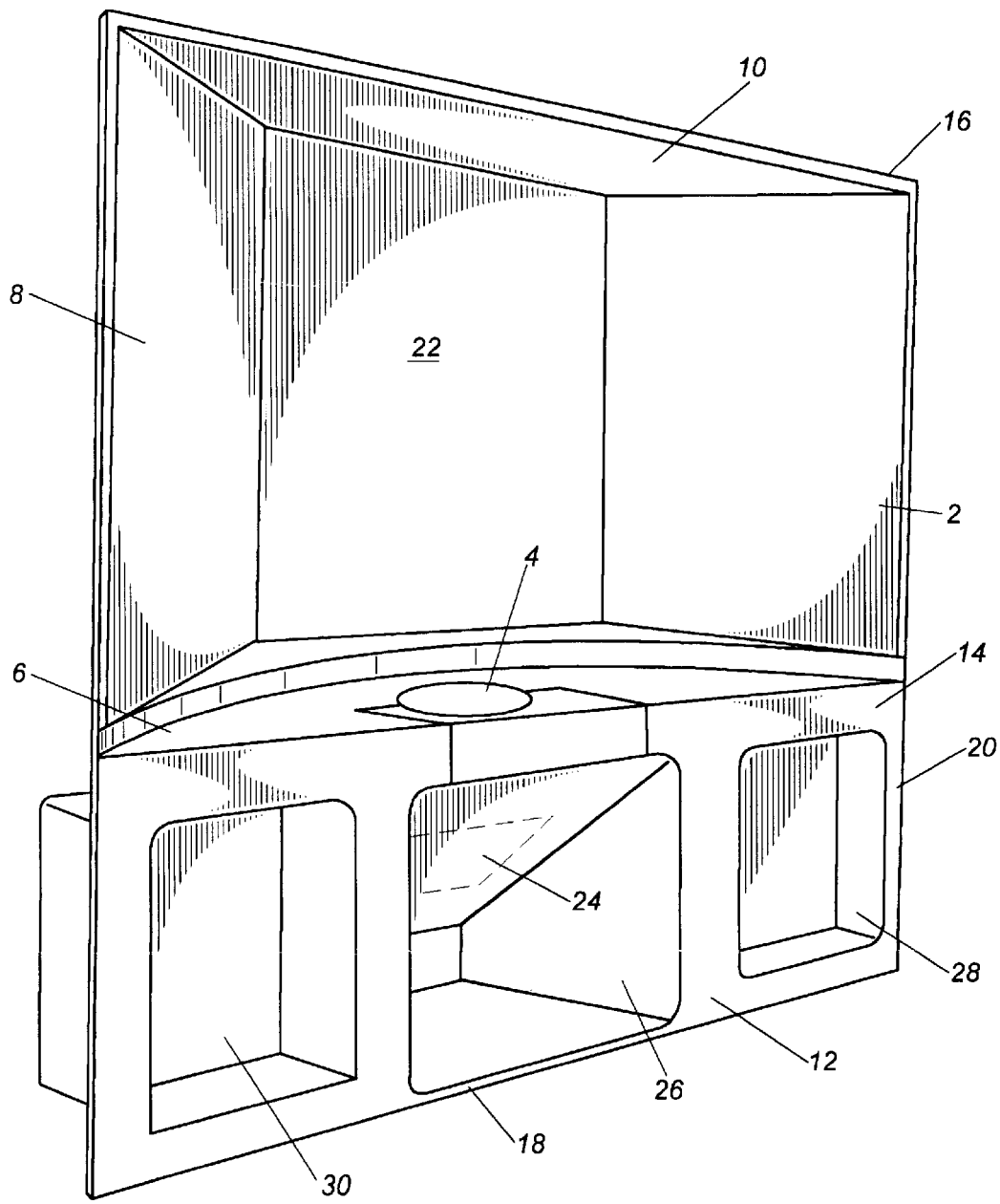
FIG. 1 is a perspective view of the modular, vacuum formed, unitary vanity.
Figure 2:
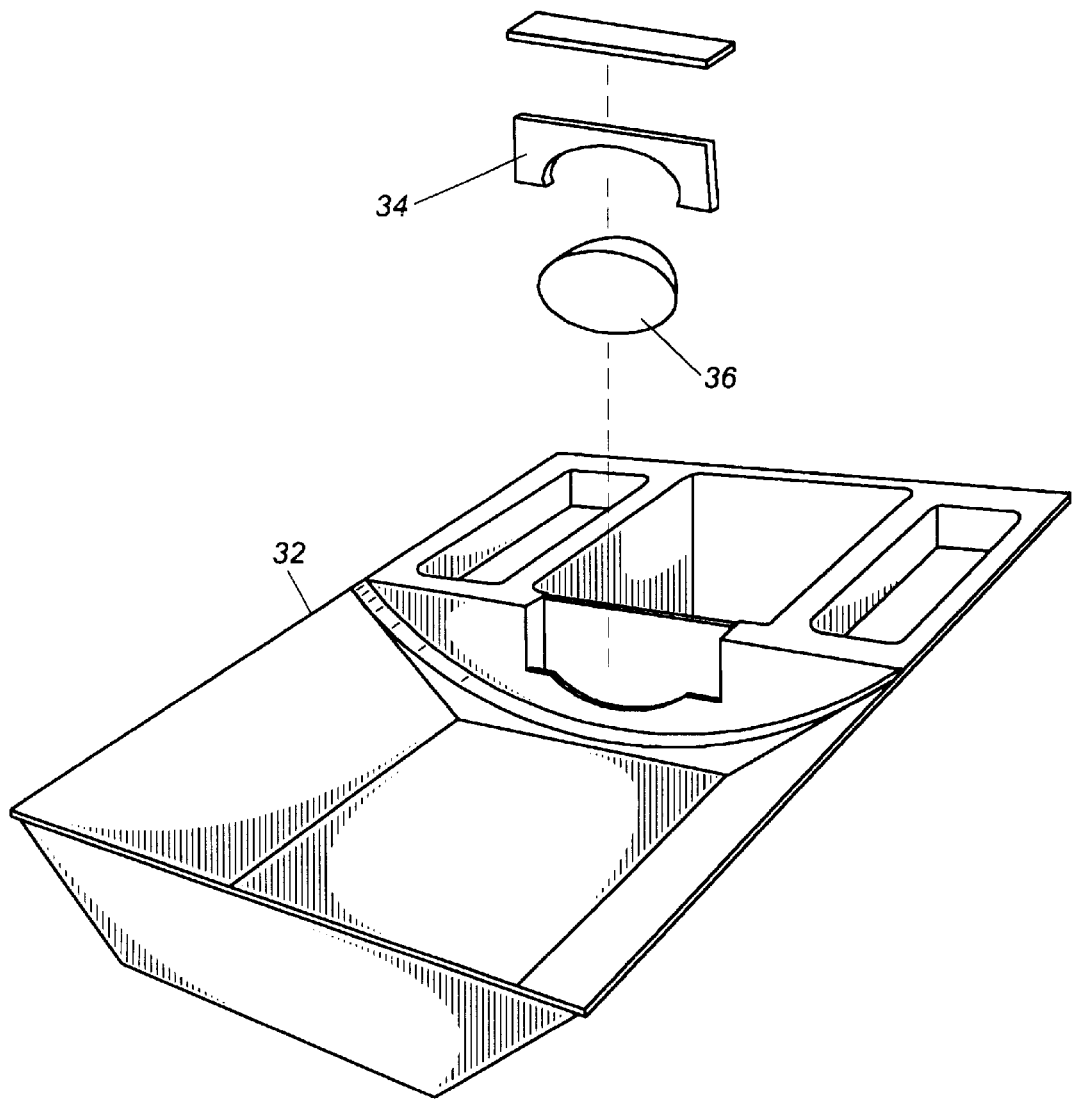
FIG. 2 is a perspective view of the mold used for forming the modular, vacuum formed, unitary vanity showing the mold separation to form the sink as an exploded view.

The vanity 2, of the present invention is a modular unit which fits within a generally rectangular or square void which is formed in a wall. At a minimum, the vanity has the following elements: a sink bowl 4, a counter top 6 which surrounds a sink bowl; a surround 8 which extends generally upwardly from the counter top; and a top 10 which extends from the surround and over the counter top. Other elements, such as a base 12 which extends from and below the counter top may be included.

The void in which the vanity is placed will typically extend from the floor to, or near, the ceiling, and the front edge 14 of the counter top will typically be generally flush with the adjoining wall, perhaps extending slightly outward from the wall. This means that the surround which extends upwardly from the counter top is recessed into the wall. Accordingly, the top 10 which extends from the surround and over the counter top is provided, so that the upper and front edge 16 of the unit is generally flush with the wall, as are the right and left edges of the surround. The bottom front edge 18, and side edges 20 of the base are also formed to be generally flush with the wall. Alternatively, the unit extends upwardly from the counter top, and the unit is appropriately formed to fit in a hole or void in the wall which extends from counter top height to about the ceiling. Again, the unit is mounted to be generally flush with wall at the appropriate points.

It is preferred that a knee hole be formed underneath the sink. Recesses may be formed on either side of the knee hole.

Accordingly, all of the described features are incorporated into a vacuum form mold 32, which is fabricated in the appropriate shape. The mold may be made of common materials used in fabricating molds for vacuum forming. The mold as shown in the drawings is formed of four pieces. Once the vanity unit is vacuum formed from formable materials, such as acrylic, it is pulled against the mold. As the material is pulled into the portion of the mold which forms the sink bowl, and into the portion of the mold which forms the top, the material will hold the part in the mold, so that the part cannot be removed. Accordingly, the mold is formed so that it breaks apart at the sink bowl. This portion of the mold can be removed from the part, and the part can be removed from the remainder of the mold. The mold therefore has a panel 34 which may be slidably removed from the mold, a sink bowl form 36, and the remainder of the mold 32 as shown in the drawings.

To form the vanity, a single, continuous piece of formable material, such as cast acrylic, is heated and is placed over the mold. Vacuum is applied to the mold as known in the art of vacuuming forming, and the material is drawn down over the mold by means of the vacuum. Other materials which may be vacuum formed could be used, including plastics or ABS.

In a preferred embodiment, a piece of acrylic which is 0.187 inches thick may be framed, and heated in an oven. When the acrylic material reaches a formable temperature, which may be at about 400° F., it is removed from the oven. The sheet is clamped over the vacuum forming mold and pulled down by a vacuum at a controlled rate, with a vacuum of approximately 5" to 10" Hg. The part as formed is cooled by fans for approximately 5 minutes to set the part which is shaped as the vanity. The part is then removed from the mold, with the slidable portion of the mold and the sink bowl mold sliding away from the remainder of the mold. The slidable, or break apart, feature of the mold may be similarly used to form other members or accessories which protrude after vacuum formation and which would typically prevent the part from being removed from the mold.

The part is then placed on a fixture, and a reinforcing material such as a polyester resin is sprayed over the vanity. Fire retardant and chopped glass reinforcement materials are sprayed on the back side of the vanity. The resulting vanity is highly rigid. The vanity as formed is unitary and non-porous, and is not subject to stains.

The resulting vanity fills a void within a wall. The vanity fits within the wall so that it is generally flush with the wall about a perimeter of the vanity. As shown in the drawings, the counter top is recessed within the wall. The sink bowl is present within the counter top. The surround extends into the recess, but is generally flush with the wall about a perimeter of the vanity. The top extends from the surround outwardly to form a top perimeter of the unit. A knee hole 26 may be formed within the vanity, which allows a person who is seated, including a person who is seated in a wheelchair to use the vanity. Recesses 28, 30 may also be provided on each side of the knee hole, for storage and the like.

The unit may be installed by inserting it within a void in a wall which is sufficiently deep to accommodate the unit, and which is wide enough and high enough to accept the unit. The unit is simply inserted into to the wall, and the carpentry required to join the unit to the wall is relatively simple. It is only necessary to provide hot and cold water supply, and drainage from the sink bowl, and the unit is fully installed. Water faucets, soap dispensers, mirrors and the like may be installed at the factory, so that these tasks need not be performed on the construction site.

The device is particularly well suited for hospitals, nursing homes, hotel/motel rooms, and apartments where multiple units will be installed. The simplicity of the installation means that it is not necessary to use multiple tradesman to build counters, install counter tops, finish dry wall associated with the vanity, install the sink, install tile and perform multiple other functions. The unit requires only relatively simple carpentry skills and relatively simple plumbing skills to install the device.

Options for the device include providing a void in the top for installation of an electrical fixture. The installation of the electrical fixture is relatively simple. The electrical fixture may be provided at the factory. In most applications, it will also be desirable to provide a mirror 22 at the back of the surround. The installation of a common mirror is also a relatively simple matter. An access panel could be formed or provided under the sink for maintenance, or for installing the plumbing from the front of the unit as required. An access void 24 may be formed in the vanity underneath the sink, without destroying the modular and unitary nature of the device. The access void may be covered with an acrylic panel or panel of other material, as desired.

The present invention provides a modular and unitary vanity. The device is simple to install at a job site, and does not require multiple tradesmen or craftsmen to install the device. The vanity is formed of a non-porous, stain proof material such as acrylic, and has a smooth surface with no joints or seams. Accordingly, the device is easy to clean, and is substantially maintenance free in ordinary use.

What is claimed is:

1. A method of making a modular, vacuum formed, unitary vanity, comprising the steps of:

a) heating a sheet of vacuum formable material;

b) placing said sheet of vacuum formable material over a vacuum form mold having a shape for forming said modular, vacuum formed, unitary vanity, wherein said vacuum form mold comprises a sink bowl form which forms a shape of a sink bowl in said vacuum formable material, and further comprises a removable slide which forms a portion of said modular, vacuum formed, unitary vanity and engages said vacuum form mold and said sink bowl form, such that the vacuum form mold breaks apart at the sink bowl;

c) applying a vacuum to said vacuum form mold to form said sheet of vacuum formable material into said modular, vacuum formed, unitary vanity;

d) allowing the vacuum formable material which is formed into the modular, vacuum formed, unitary vanity to cool and set; and e) removing the modular, vacuum formed, unitary vanity from the vacuum form mold while slidably removing said slide and removing said sink bowl form from said mold with said modular, vacuum formed, unitary vanity and removing said slide and sink bowl form from said modular, vacuum formed, unitary vanity.

2. A method of making the modular, vacuum formed, unitary vanity as described in claim 1, wherein said vacuum formable material comprises acrylic.

3. A method of making the modular, vacuum formed, unitary vanity as described in claim 2, further comprising the step of applying a polyester resin to the modular, vacuum formed, unitary vanity.

* * * * *